(12) United States Patent
Allard (10) Patent No.: US 7,353,239 B2
(45) Date of Patent: Apr. 1, 2008

(54) ONLINE INTERACTIVE VOTING SYSTEM FOR LIVE INTERACTIVE EVALUATION AND COMPARISON OF PROPOSALS

(76) Inventor: Fredrik Allard, Professereslingen 43, Stockholm (SE) S-104 05

( * ) Notice: Subject to any disclaimer, the term of this patent is extended or adjusted under 35 U.S.C. 154(b) by 218 days.

(21) Appl. No.: 10/470,152

(22) PCT Filed: Jan. 24, 2002

(86) PCT No.: PCT/SE02/00125

§ 371 (c)(1),
(2), (4) Date: Nov. 17, 2003

(87) PCT Pub. No.: WO02/059789

PCT Pub. Date: Aug. 1, 2002

(65) Prior Publication Data

US 2004/0078262 A1    Apr. 22, 2004

(30) Foreign Application Priority Data

Jan. 24, 2001  (SE)  .................... 0100202

(51) Int. Cl.
*G06F 7/00* (2006.01)
(52) U.S. Cl. .................. 707/104.1; 707/102; 705/12
(58) Field of Classification Search ............ 707/104.1, 707/102, 103 R, 206; 705/12; 711/101, 711/117, 216, 221, 215
See application file for complete search history.

(56) References Cited

U.S. PATENT DOCUMENTS

| 4,937,843 | A | * | 6/1990 | Takemoto | 375/368 |
| 5,400,248 | A | * | 3/1995 | Chisholm | 705/12 |
| 5,878,399 | A | * | 3/1999 | Peralto | 705/12 |
| 5,893,098 | A | * | 4/1999 | Peters et al. | 707/10 |
| 6,092,051 | A | * | 7/2000 | Kilian et al. | 705/12 |
| 6,175,833 | B1 | | 1/2001 | West et al. | |
| 6,311,190 | B1 | * | 10/2001 | Bayer et al. | 705/12 |
| 6,314,420 | B1 | * | 11/2001 | Lang et al. | 707/3 |
| 6,366,924 | B1 | * | 4/2002 | Parce | 707/104.1 |
| 6,549,950 | B2 | * | 4/2003 | Lytle et al. | 709/246 |
| 6,662,217 | B1 | * | 12/2003 | Godfrey et al. | 709/219 |
| 6,754,348 | B1 | * | 6/2004 | Sako | 380/251 |
| 6,769,013 | B2 | * | 7/2004 | Frees et al. | 709/205 |
| 6,799,723 | B2 | * | 10/2004 | Kotob et al. | 235/386 |
| 6,845,447 | B1 | * | 1/2005 | Fujioka et al. | 713/156 |
| 2002/0019767 | A1 | * | 2/2002 | Babbitt et al. | 705/12 |
| 2002/0083126 | A1 | * | 6/2002 | Best et al. | 709/203 |
| 2002/0103695 | A1 | * | 8/2002 | Urken et al. | 705/12 |

* cited by examiner

*Primary Examiner*—Wilson Lee
*Assistant Examiner*—Michael Le
(74) *Attorney, Agent, or Firm*—Nixon & Vanderhye P.C.

(57) ABSTRACT

An online system for conducting live interactive evaluation, comparison and selection of proposals includes a standardized database architecture that integrates proposal submission and proposal judgement procedures. The system can host multiple applications, each configured separately by the respective application administrator, each with a separate background process and each with a separate application database containing information about proposals, users, and proposals not yet judged by identified users. The separate background processes are registered in a hash table and the different application databases in a settings table in a separate system database. The proposal submission procedure allows users to submit proposals, and the judgement procedure allows users to judge submitted proposals. The respective background process rules the application by controlling the flow of proposals, and by facilitating and enhancing interaction by users.

14 Claims, 6 Drawing Sheets

Fig. 5
Pages database

Table Settings

| DatabaseName | Root | N | C | ET | JL |
|---|---|---|---|---|---|
| Company Ltd | /Company Ltd | 3 | 2 | 2 | 1 |
| WebPortal | /WebPortal | 10 | 1 | 1 | 1 |

Fig. 6
Application database

| Application database |
|---|
| Table Proposals |
| Table Personal |
| Table UnratedProposals |

Fig. 7
Table Proposals

| Proposal ID | State | PersonID | Subject | Proposal | ABS | BF1 | BF2 | BF3 | BF4 | BF5 | JuNe | Current Results | Mean | Transition Time |
|---|---|---|---|---|---|---|---|---|---|---|---|---|---|---|
| 1 | 3 | JkoP14a | Terrori | Fight ter | 34 | 2 | 5 | 8 | 3 | 1 | 0.12 | 0.023 | 2.79 | 97255888 |
| 2 | 1 | PluT51n | Coffee | Drink c | 41 | 2 | 2 | 3 | 4 | 1 | 0.15 | 0.025 | 3.0 | 98125421 |

Fig. 8
Table Personal

| PersonID | Password | Fname | Lname | Email | Telephone number | Sex | BirthDate |
|---|---|---|---|---|---|---|---|
| Fke54et | 5477 | Lars | Pettersson | LP@mymai | +46-8-741241 | M | 291268 |
| DkrW5s | 1247 | Lena | Nilsson | Lena@comi | +46-8-121174 | F | 211174 |

Fig. 9
Table UnratedProposals

| ID | ProposalID | PersonID |
|---|---|---|
| 8 | 4 | DreW12a |
| 9 | 4 | SfEr41d |
| 10 | 4 | DreT16f |
| 11 | 5 | DreW12a |
| 12 | 5 | JYRe41f |

ONLINE INTERACTIVE VOTING SYSTEM FOR LIVE INTERACTIVE EVALUATION AND COMPARISON OF PROPOSALS

CROSS-REFERENCES TO RELATED APPLICATIONS

This application is the U.S. national phase of international application PCT/SE02/00125 filed 24 Jan. 2002, which designated the U.S., the entire contents of which are hereby incorporated herein by reference.

TECHNICAL FIELD

The present invention relates to online voting systems. More particularly, the present invention relates to a database system facilitating live interactive evaluation and categorization of proposals over a network such as the Internet.

BACKGROUND OF THE INVENTION

The Internet provides a wonderful forum for mass distribution of information. Associated with the concept of mass distribution of information is the problem of information overload and difficulties identifying relevant pieces of information.

Another known problem is the difficulty of involving large numbers of people in intellectual processes. To allow efficient handling of information the number of people involved at critical stages of the information handling process, such as setting the agenda or formulating problems, has to be reduced to one or a few persons.

A process allowing many people to be efficiently involved in the identification of the most relevant pieces of information would solve both problems.

SUMMARY OF THE INVENTION

Thus, generally in an online system for conducting live interactive evaluation and comparison of proposals a standardized database architecture is provided that integrates proposal submission and proposal judgment procedures. The system has a system database containing information about different applications and a separate application database for every application. The system also has a Hash Table containing information about the background processes of the different applications and a separate background process for every application. There is also a server to transfer information to and receive information from the users of the system over a network, e.g. the Internet. The system includes web server software.

A proposal submission procedure is provided allowing users to submit proposals and a judgment procedure allowing users to judge submitted proposals. The administrator of an application has a procedure to create new user identities and to adjust the parameters of the system. A login procedure and a logout procedure are provided.

An application database has a table for storing information about multiple proposals, a table for storing information about the users and a table for identifying proposals not judged by a particular user.

The background process comprises multiple methods to advance or propagate the proposals through the system with respect to stated criteria concerning every possible advancement. One of these methods includes a method to evaluate, compare and select winning proposals using judgments entered by users. There is also a method to delete old proposals and a method to delete old judgments. The background process also has a method to calculate how urgently a proposal needs another judgment to be safely included in or excluded from the winning group of proposals, a method to calculate the probability that a proposal will finally belong to the winning proposals and a method to calculate the possibly adjusted mean of registered judgments for a proposal.

The system can be used to enhance interactivity on Web sites, to enhance interactivity in discussions, to improve the democratic process, to empower employees and members of organisations, to encourage intellectual contributions by employees and members of organisations, to collect and analyse data and to enhance interactivity in association with broadcast media.

Thus generally, there is in an online system for facilitating live interactive evaluation, comparison and selection of a specified number of proposals by users a server comprising a processor and a memory for storing an application database. The application database includes a proposal table into which incoming proposals are entered and which also contains other information on the proposals. In the memory there is thus an area for storing information for all the proposals and a memory place in the area for the information associated with each proposal. The proposals are discarded or moved from a stage to a following stage in an automatic process. The stages are arranged in a predetermined successive order and there are at least three stages. One stage can be a judgment or voting stage. User means are provided for the users, such as a personal computer and software executed by the computer. The user means are connected to the server such as over the Internet. The user means comprise displaying means such as a monitor and software controlling what is displayed on the monitor. In particular the displaying means allow a user to be informed of information in the application database and in particular of information stored in said memory area for the proposals. The user means further comprise input means for entering information such as a keyboard and associated software. In particular the input means include means for entering, to fields in the memory area, information on judgments or grades given to proposals that are in the judgment stage. The server is preferably arranged so that the memory place for a proposal in the memory area includes a stage field, in which an indication is stored of the stage in which the proposal is. Generally also, the stages include, in addition to the judgment stage an evaluation stage following directly after the judgment stage and another stage following directly after the evaluation stage.

The server is arranged to execute a background process in which information about proposals is automatically eliminated so that thereby proposals are discarded, and in which the indications stored for proposals are to automatically changed so that thereby proposals are displaced from a stage to a following one. The automatic eliminating and changing of the indications are executed depending on information entered by the users and according to predetermined rules. The rules are unique for proposals of the same stage, i.e., for proposals for which the indications stored at their memory places indicate that they are in the same stage, and they are also unique for each displacement of proposals from a stage to a following stage, i.e., for each change of indication of stage.

Furthermore, the server can be arranged to execute the background process so that for all proposals in the judgment stage, i.e., for all proposals for which the indications stored in their stage fields indicate that they are in the judgment stage, the information stored on the memory places for these proposals about the information on judgments or grades given by the users is evaluated in such a way that only a predetermined number is moved to the next stage. This means that from proposals in the judgment stage only a predetermined number of proposals are selected and then their indications stored in the stage field are changed to indicated the next stage. The selection can preferably be made at the end of periodically repeated time periods. The other proposals in the judgment stage are discarded, i.e., the information stored on their memory places is eliminated.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
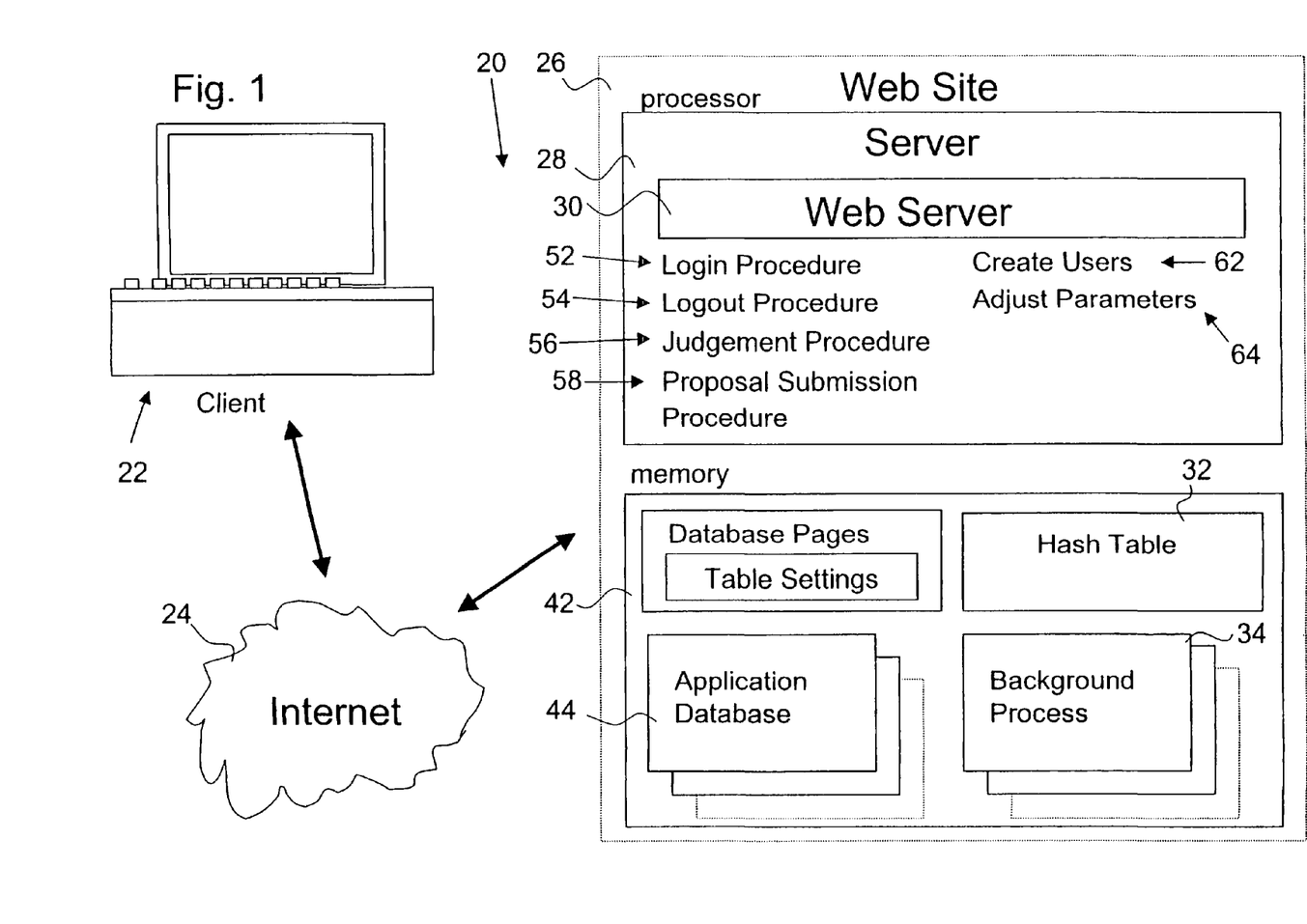
FIG. 1 is a diagrammatic illustration of a simple computer network system having a client and a Web site.

A computer network system, particularly one on the scale of the Internet, has many host network servers connected to serve data to many clients over a network. FIG. 1 shows a simple computer network system 20 representative of the familiar, large-scale Internet environment. The system 20 has a client computer 22 resident at a user's premises. Although illustrated as a desktop PC, the client computer 22 is representative of many different types of computing devices, including portable computers, hand held computers, pagers, Web-phones, set-top boxes for TVs, and so forth.

The client computer 22 connects to the Internet 24 via a modem, network card, or other type of interface. The client computer 22 runs a Web browser application, not shown, to access content provided on the World Wide Web. The Web content is maintained at a variety of Web sites, as represented by the Web site 26.

The Web site 26 has one or more server computers, collectively referred to as server 28. The server computers may be implemented in various ways, including Unix-based server computers or PC-based computers. The server 28 includes electronic processing means such one more processors running a Web server software program 30 that accepts requests from the client-based Web browser, accesses data stored in a memory in or at the server, the data including a HashTable 32 with corresponding background processes 34 and a system database Pages 42 with corresponding application databases 44.

The Web pages are transmitted using conventional network protocols, such as TCP/IP (Transmission Control Protocol/Internet Protocol), HTTP (Hypertext Transfer Protocol) and DCOM (Distributed Component Object Model). The client-based browser, or other application, renders the Web page into human-perceptible form. The Web page might include text, images, sound, video, active code, and so forth.

Of particular interest in this system 20 is a technique for conducting live interactive evaluation and comparison of proposals. A proposal submission procedure 58 invoked by a servlet SProposalSubmit allows one or more users to submit proposals. A judgment procedure 56 invoked by a servlet SUnratedView allows users to judge proposals according to a method common to all proposals in the application. The system uses one or more evaluation procedures to evaluate and/or compare submitted proposals using judgment submitted by the users. The result of the evaluation procedure is distributed to individuals or other systems for further use or used to select a fraction of the proposals for further use or distribution to individuals or to other systems.

To illustrate the context, consider the following scenario, which will be relied upon throughout this discussion. Suppose that the web site 26 contains a discussion forum where current political issues are discussed by the public.

Then, the Proposal Submission Procedure 58 executed in the server 28 allows users to submit proposals for issues to discuss. The Judgment Procedure 56 allows users to enter judgments concerning proposals. The Login Procedure 52 and the Logout Procedure 54 allow users to enter and exit the application. A procedure Create Users 62 allows an administrator to issue new user identities for distribution to potential new users of the application. The administrator can access a Procedure Adjust Parameters 64 to adjust values of different system parameters. Each application has a Background Process 34, described in detail below, which is executed by the processing means of the server and controls the flow of proposals through the application and invokes a number of different methods contained in the process.

The Background Process will now be described using object oriented terminology and concepts used in the Java language. Every application of the System 20 corresponds to a separate application of the Background Process. To separate the different Background Processes the HashTable 32 contains a unique identifier for each application.

The Background Process 34 is implemented by the class PSP, which inherits the class Thread and is executed independently in a separate thread. A Background Process thus exists for every application of the system. The Background Process is arranged in an "eternal" loop in the method run( ).

Figure 4:
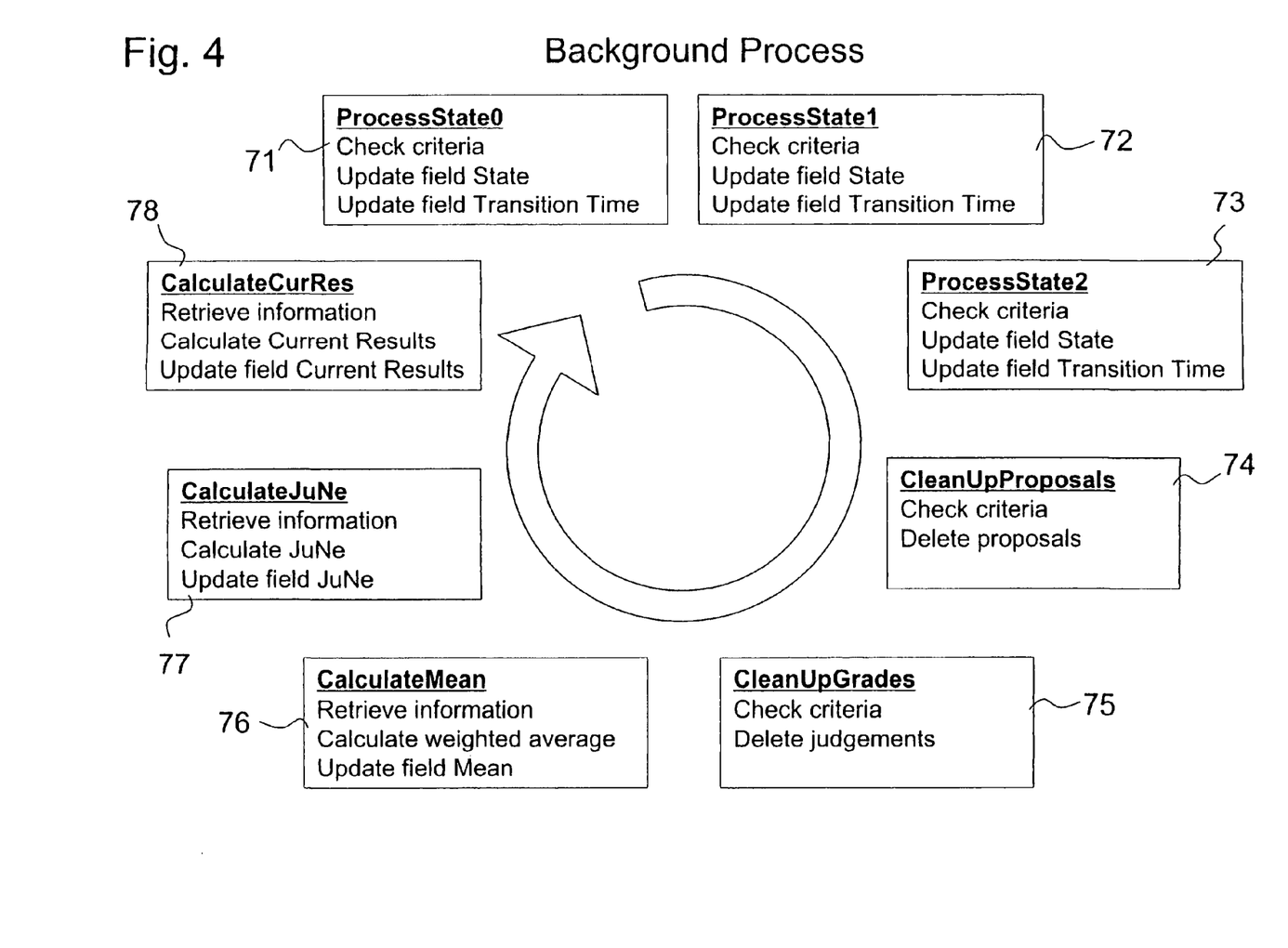
FIG. 4 is a diagrammatic illustration of the background process.

The Background Process is illustrated in FIG. 4. It contains the methods ProcessState0 71, ProcessState1 72, ProcessState2 73, CleanUpProposals 74, CleanUpGrades 75, CalculateMean 76, CalculateJuNe 77, and CalculateCurRes 78.

The method ProcessState0 71 compares all the proposals in the table Proposal, see the discussion hereinafter, to criteria for removal to state 1. A criterion for removal to state 1 may be that a certain amount of time has elapsed since the time indicated by the time stamp in the field Transition Time in the table Proposal. A compulsory criterion is that the proposal to be removed is currently in state 0 as indicated in the field State in the table Proposal, as will be described below. Proposals found to fulfil the criteria are removed to state 1 by the same method 71, by changing the value in the field State from 0 to 1. At the same time the time stamp in the field Transition Time is updated.

The method ProcessState1 72 compares all the proposals in the table Proposal to criteria for removal to state 2. A criterion for removal to state 2 is that all the users registered in the system have judged the proposal. Another, independent, criterion is that a specified amount of time has elapsed since the time indicated by the time stamp in the field Transition Time in the table Proposal, as will be described below. A compulsory criterion is that the proposal to be removed is currently in state 1. Proposals found to fulfil the criteria are removed to state 2 by the same method 72, by changing the value in the field State from 1 to 2. At the same time the time stamp in the field Transition Time is updated.

The method ProcessState2 73 first calculates the difference between present time and the time registered in the field Transition Time in the table Proposals for the proposal last transferred to state 3. If this difference is smaller than the value of C as entered by the administrator, see the discussion below, the remaining part of the method is not executed, and the Background Process continues instead with the method CleanUpProposals 74. If the difference is found to be equivalent to or larger than C the remaining part of the method is executed. The method then compares all the proposals in the table Proposal to criteria for removal to state 3. A criterion for removal to state 3 in the described application is that the value registered for the proposal in the field Mean in the table Proposal belongs to the highest N values, to be described below, registered in this field among proposals in state 2, i.e., that the proposal is among the N best proposals and thus considered to be a "winner". The method evaluates and compares every proposal in state 2 to the other proposals in state 2 to find out if the proposal should be selected or rejected. A compulsory criterion for removal to state 3 is that the proposal is currently in state 2. Proposals found to fulfil the criteria are selected and removed to state 3 by the same method 73, by changing the value in the field State from 2 to 3. At the same time the time stamp in the field Transition Time is updated.

The method CleanUpProposals 74 compares all the proposals in the table Proposal to criteria for deletion. Criteria for deletion in the described application is that an amount of time equivalent to or exceeding the parameter ET as registered in the table Settings in the database Pages, as will described below, has elapsed since the time indicated by the time stamp in the field Transition Time in the table Proposal and that the proposal is currently in state 2. Proposals found to fulfil the criteria are deleted from the table Proposal by the same method 74.

The method CleanUpGrades 75 compares all the entered judgments as registered in the table Proposal to criteria for deletion. A criterion for deletion is that an amount of time equivalent to or exceeding the parameter JL as registered in the table Settings in the database Pages has elapsed since the judgment was entered. Judgments found to fulfil the criteria are deleted from the table Proposal by the same method 75.

The method CalculateMean 76 calculates the mean of entered judgments using the formula $$m_i = \frac{\sum x_{ki} + C}{n_i + 1}$$

where $m_i$ is the mean, $x_{ki}$ the judgment of an individual proposal,

C a constant, and $n_i$ the number of judgments concerning the proposal entered by the users.

The information is found in the table Proposal. The users are stratified using values of date of birth and sex found in the table Personal to be described below, and the mean for each stratum is calculated using the above formula. A weighted average is then calculated, the weight of every stratum being proportional to the number of users in the stratum. The calculated weighted average is entered into the field Mean in the table Proposal by the same method 76.

The method CalculateJuNe 77 calculates the value of JuNe using the formula $$JuNe_a = \varphi^2 \left( \frac{m_a - m_r}{\frac{\sigma_a}{\sqrt{n_a}} + \frac{\sigma_r}{\sqrt{n_r}}} \right) \cdot \frac{\sigma_a^2}{\sigma_a^2 n_r + \sigma_r^2 n_a} \cdot \frac{n_r}{n_a}$$

where $$\varphi(x) = \frac{1}{\sigma\sqrt{2\pi}} \cdot e^{-(x-\mu)^2/2\sigma^2}$$

$m_a$ is the calculated mean of the proposal considered, $m_r$ is the calculated mean of a reference proposal, the reference proposal being proposal N+1 in a list of all proposals arranged in a falling order according to calculated mean when the considered proposal is ranked N or better in the same list, the reference proposal being proposal N when the considered proposal is ranked N+1 or worse in the same list, $n_a$ is the number of judgments entered concerning the considered proposal, $n_r$ is the number of judgments entered concerning the reference proposal, $\sigma_a$ is the standard deviation of the judgments of the considered proposal and $\sigma_r$ is the standard deviation of the judgments of the reference proposal, the standard deviation being calculated using the formula $$\sigma_j^2 = \frac{A + \sum (x_{ki} - m_i)^2 + \dfrac{\min(B, p) \cdot \sum_{k \neq j} s_k^2}{(p-1)}}{B + n_j - 1 + \min(B, p)}$$

where $x_{ki}$ the judgment of an individual proposal, $m_i$ is the mean of judgments of the same proposal $$\sum_{k \neq j} s_k^2$$

is the mean of standard deviations for all the other proposals in the application, p is the number of judgments concerning a proposal entered by the users, and A and B are constants.

The calculated value of JuNe is entered into the field JuNe in the table Proposal by the same method 77.

The method CalculateCurRes 78 calculates the probability that a proposal will be among the winning N proposals using a simulation procedure with S simulations. The considered proposal will be found in place N, see the description below, or better G times. The value calculated by the method is G/S. Simulation is performed using random numbers $$Z_j \in N(m_j, \sigma_j)$$

where $m_j$ is the mean and $\sigma_j$ is the standard deviation the standard deviation being calculated using the formula $$\sigma_j^2 = \frac{A + \sum (x_{ki} - m_i)^2 + \dfrac{\min(B, p) \cdot \sum_{k \neq j} s_k^2}{(p-1)}}{B + n_j - 1 + \min(B, p)}$$

where $x_{ki}$ the judgment of an individual proposal, is the mean of judgments of the same proposal $$\sum_{k \neq j} s_k^2$$

is the mean of standard deviations for all the other proposals in the application, p is the number of judgments concerning a proposal entered by the users, and A and B are constants.

The calculated value is entered into the field Current Results in the table Proposal by the same method 78.

The Application Database

Figure 6:
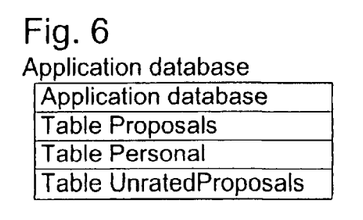
FIG. 6 is a diagrammatic illustration of an application database maintained at the Web site.

The configuration of the application database is shown in FIG. 6. It contains three tables: Personal, Proposals and UnratedProposals, all described in detail below. Each table is stored in the memory of the server and the records and the fields of the records have corresponding storing places in the memory.

The Table Personal

Figure 8:
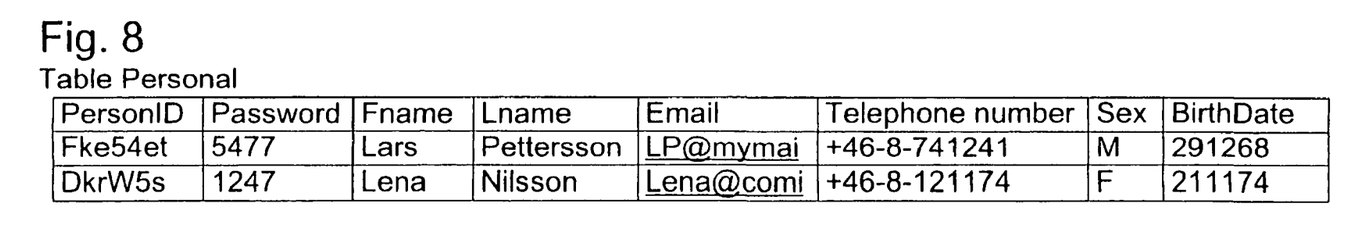
FIG. 8 is a diagrammatic illustration of the table Personal, containing information about users of the system, maintained as a database data structure at the Web site.

The layout of the table Personal is illustrated in FIG. 8. Each record or line of the table contains fields for a unique identifier for every user, password, first name, last name, email address, telephone number, sex and date of birth. Specifically, the field PersonID contains the unique identifier and is filled in automatically by the servlet SCreateUsers when requested by the administrator. The field Password is filled in automatically by the same servlet. All fields except the PersonID field may be filled in and changed by the user identified in the PersonID field, with the exception of the PersonID field which may not be altered. Each user has a personal row in the table and the number of rows corresponds to the number of users registered.

The Table Proposal

Figure 7:
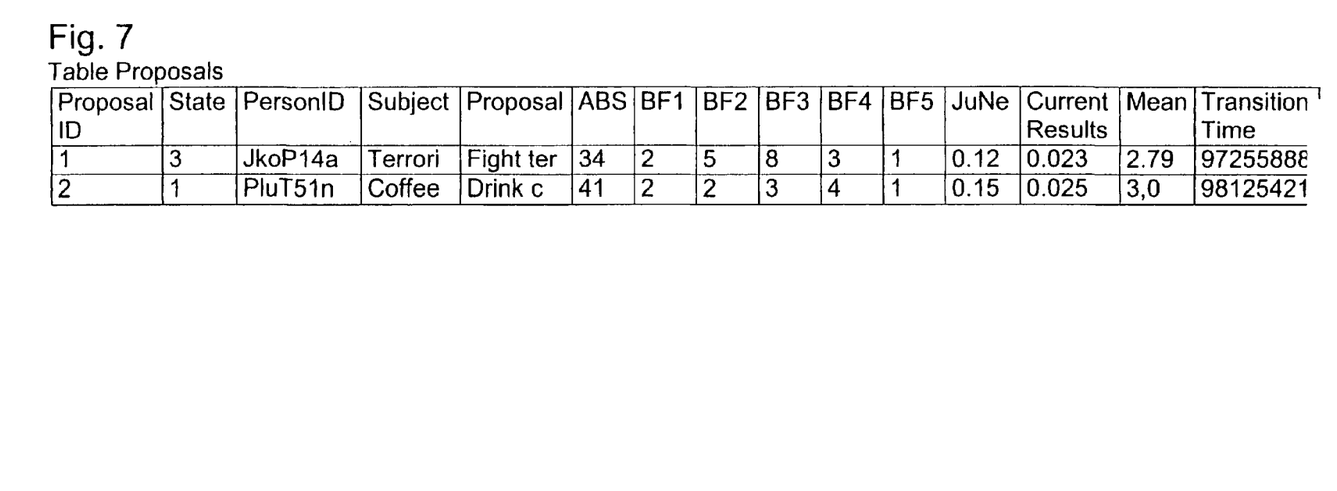
FIG. 7 is a diagrammatic illustration of a proposals table maintained as a database data structure at the Web site.

The layout of the records of the table proposal is shown in FIG. 7. Each record contains fields having information about all the proposals in the application. In particular, the field ProposalID contains a unique identifier for each proposal and is filled in automatically by the servlet SProposalSubmit when a proposal is submitted to the system by a user. The field State contains information about how far the proposal has progressed within the application. The value "0" indicates that the proposal has not been the objective of judgments by users. The value "1" indicates that the proposal is available for users to judge, but is not yet being evaluated or compared to other proposals. The value "2" indicates that the evaluation and reciprocal comparison of the proposal, based on judgments entered by users, has started. The value "3" indicates that the proposal has not been removed from the application and has been categorized as a winner based on reciprocal comparison with other proposals. The proposal is available for further use. The field is filled in by the servlet SProposalSubmit when a user enters a proposal and is updated by the methods ProcessState0, ProcessState1 and ProcessState2 of the Background Process.

The table Proposal contains in each line a key to the table Personal in the field PersonID, containing the unique identifier of the user who submitted the proposal and is filled in automatically by the servlet SProposalSubmit. The field Subject contains information about the proposal entered by the user and the field Proposal contains the proposal as a text file, sound file, picture file or other file. The remaining fields correspond to the judgment method used in the system. In this application the fields are ABS, indicating the number of registered users who have not yet judged the proposal, BF1 indicating the number of users who have judged the proposal giving it grade 1, BF2 indicating the number of users who have judged the proposal giving it grade 2, BF3 indicating the number of users who have judged the proposal giving it grade 3, BF4 indicating the number of users who have judged the proposal giving it grade 4 and BF 5 indicating the number of users who have judged the proposal giving it grade 5. The field JuNe contains a number indicating how strongly the proposal "needs" another judgment by a user to be safely differentiated from the border between the N winning proposals, see the discussion below, and the remaining proposals. The field is filled in automatically by the method CalculateJuNe of the Background Process. The field Current Results contains a number indicating the probability that the proposal will be among the N winning proposals and is filled in automatically by the method CalculateCurRes of the Background Process. The field Mean contains the mean value of judgments entered by users and is filled in automatically by the method CalculateMean of the Background Process. The field TransitionTime contains a time stamp indicating the time for the latest significant event in the history of the proposal, namely submission or latest change of state, as has been indicated above. Every proposal has a separate row in the table and the number of rows corresponds to the number of proposals registered.

The Table UnratedProposals

Figure 9:
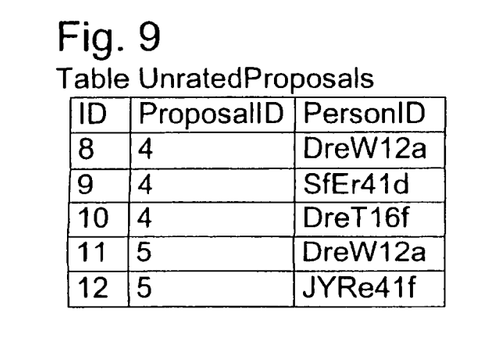
FIG. 9 is a diagrammatic illustration of an unrated proposals table, containing information about proposals not judged by particular users, maintained as a database data structure at the Web site.

The table Unrated Proposals is shown in FIG. 9. It contains information about proposals not yet judged by a user. Every row has a unique identifier in the field ID, filled in automatically by the System. The field ProposalID contains the unique identifier of a proposal not yet judged by a user and the field PersonID contains the unique identifier of the user who has not yet judged the proposal.

The System Database Pages

Figure 5:
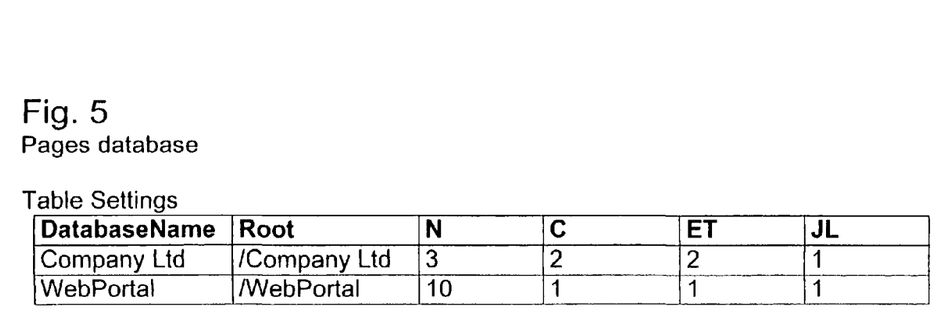
FIG. 5 is a diagrammatic illustration of a settings table maintained as a database data structure at the Web site.

The configuration of the database Pages is shown in FIG. 5. It contains the table Settings. Each record or line of this table includes a field DatabaseName containing a unique identifier for every application in the System and corresponding to a particular group of users, i.e. members of a certain organisation using the system. The field is filled in by a "global administrator". The field Root contains information about where information about the layout used in the application can be found, allowing different groups of users to have their own graphical design of the interface. The remaining fields contain values for the parameters of every application, N, C, ET and JL as defined below. Every application is represented by a separate row in the table, and the number of rows corresponds to the number of applications registered in the system.

User Action

Figure 2:
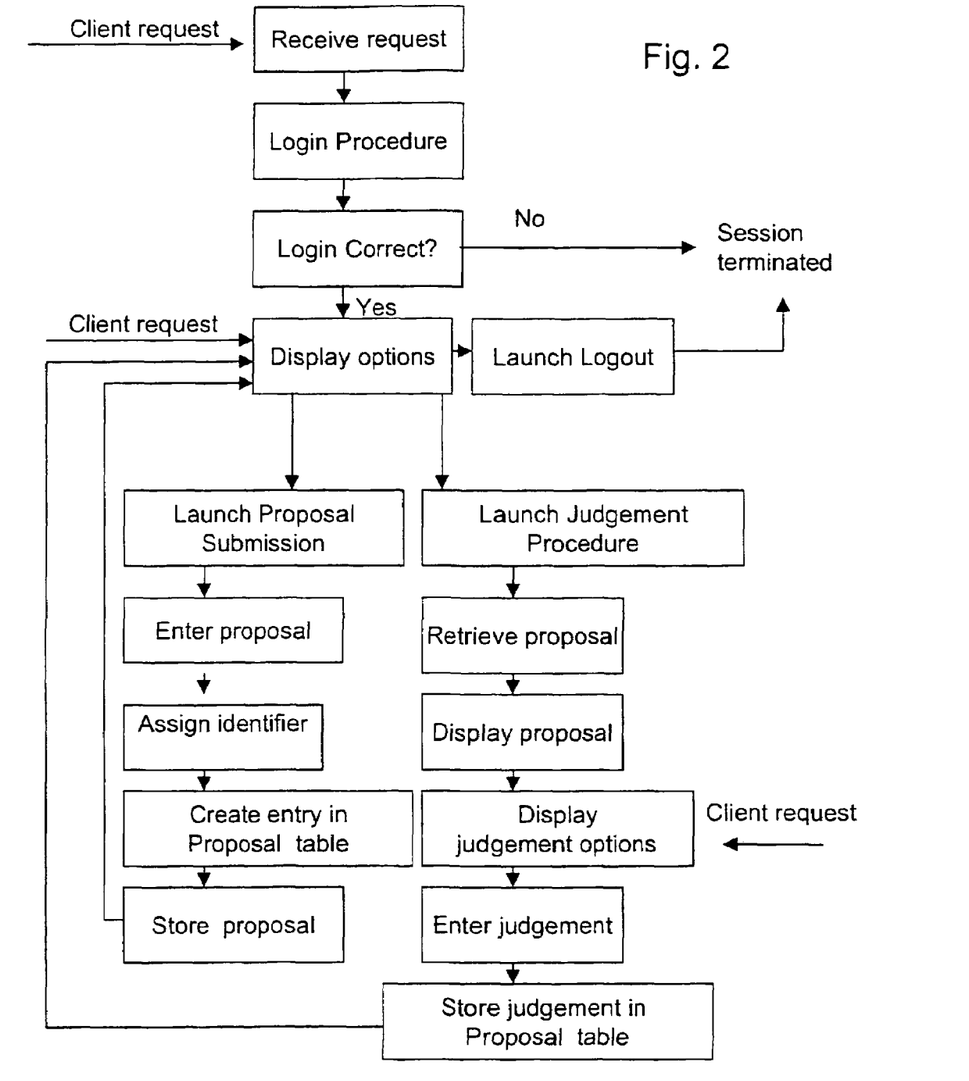
FIG. 2 is a flow diagram showing steps available to a user (non-administrator) of the system.

The general actions taken by a user and the responses to the actions are illustrated by the flowchart of FIG. 2.

When a user requests the login page in the form of a HTML- or XML-document by submitting the address to the page in a Web browser, a login file login.html is passed to the user and the file is shown as a login-picture on the screen of the user's terminal by the user's Web browser. The user enters data in different fields in the login picture, such as username and password. This information is passed to the server 28 and is processed by a servlet SLogin. If the obtained data are found to be correct when compared to information stored in the database in the table Personal, the user is connected to the requested application. The file FrameSet.thtml is then passed to the user's terminal and showed by the Web browser as a picture. The picture corresponding to the part of the file named Leftframe.htm is a menu which is showed in all the pictures of the application. The menu contains the alternatives "Submit proposal", "Judge proposal", "Personal" and "Logout". By marking or clicking, i.e. with a mouse, a field containing the text of an alternative, the Server 28 either passes a new file to the user's terminal 22 or starts a Procedure.

When a user activates the alternative "Submit proposal", a file Proposal.htm is passed to the user's terminal and is shown by the users Web browser as a new picture. In this picture the user is invited to submit a new proposal. When the alternative "Judge proposal" is activated the servlet SUnratedView generates a file RateProposal.thtml, containing a proposal which has not been judged by the user. The file is passed to the user's terminal, where it is shown as a picture by the Web browser. The picture contains information about the proposal and a field to enter a judgment concerning the proposal according to a predetermined method used in the entire application for all proposals, i.e., grades on a scale 1-5 or a judgment based on comparison with another proposal shown in the same picture. The proposal passed to the user is either chosen automatically by the servlet or manually by the user, both procedures described in detail below. When a user activates the alternative "Personal" a servlet SpersonView is activated. This servlet requests personal data for the user from the table Personal and creates a file which is sent to the terminal of the user and showed as a picture by the Web browser. In this picture personal information of the user is shown and the user may change this information, with the exception of PersonID which may not be changed. When a user activates the alternative "Logout" a servlet Slogout is activated, terminating the session and allowing the user to leave the application.

Figure 3:
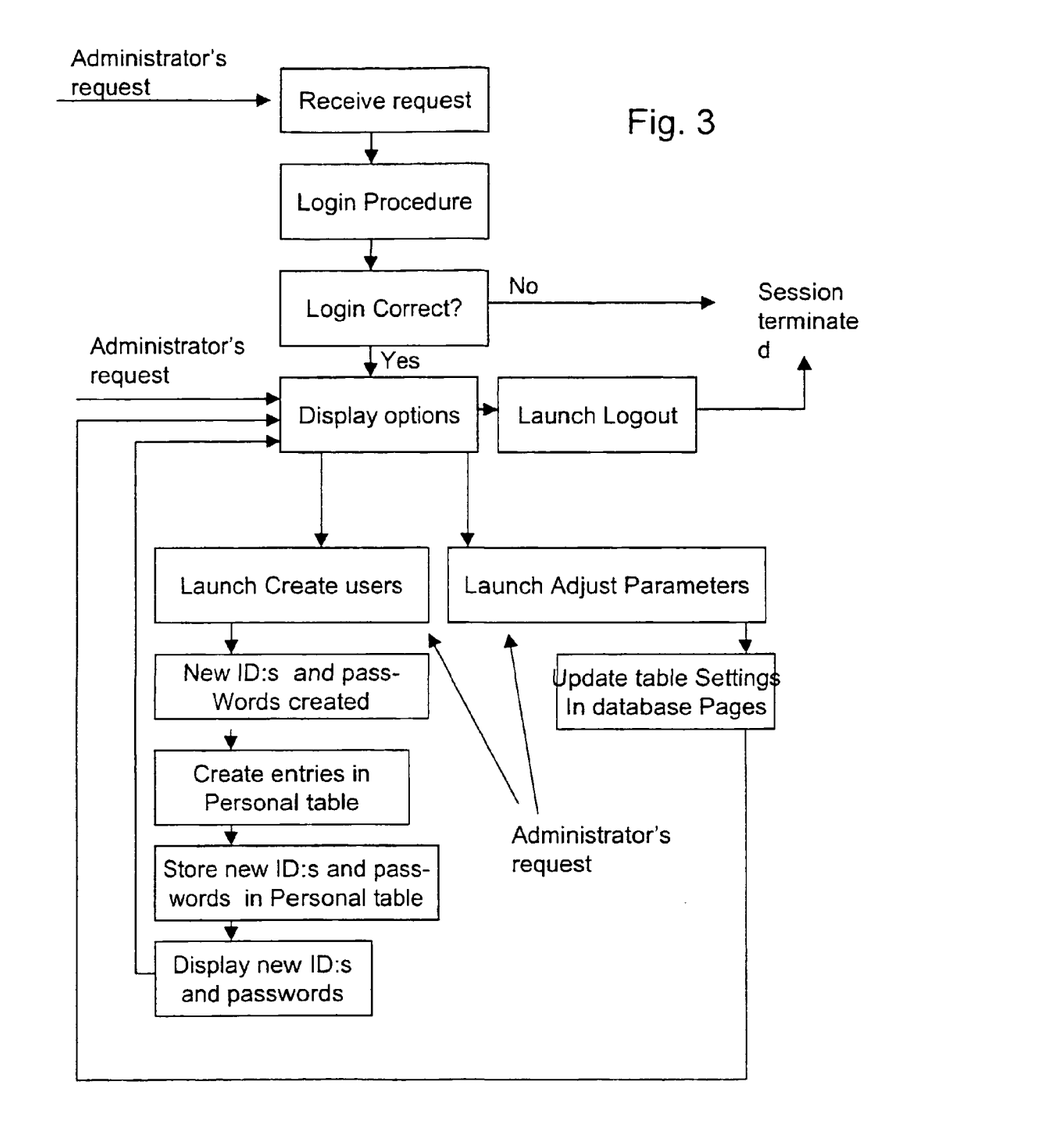
FIG. 3 is a flow diagram showing steps available to the administrator of an application.

The actions taken by a persons administrating an application and the system responses thereto are illustrated by the flowchart of FIG. 3. Thus, when an administrator logs in the same events take place as when a user logs in as described above, with the difference that the file LeftFrameAdmin.htm is used instead of the file LeftFrame.htm, showing a menu containing the alternatives "Adjust Parameters" and "Create new users". When the alternative "Adjust Parameters" is activated the servlet SAdmin creates a file which is sent to the administrator's terminal and showed as a picture by the Web browser. This picture shows the different parameters of the application and their current values, which can be adjusted by the administrator. When the alternative "Create new users" is activated a file NewUsers.htm is passed to the administrator's terminal and showed as a picture by the Web browser. This picture allows the administrator to create new user identities and corresponding passwords which can then be passed to new users allowing them to become users of the application.

When a user activates the alternative "Submit Proposal" the file Proposal.htm is sent to the user's terminal as a part of the file FrameSet.thtml and showed as a part of the picture presented on the screen by the Web browser. The picture contains one or more fields where a proposal and information about the proposal may be entered by the user. When the proposal has been entered by the user, a servlet SproposalSubmit is started, generating a unique identifier ProposalID for the new proposal and entering the new proposal including the identifier and submitted information about the proposal into the table Proposal, also indicating the current state of the proposal, see below. The same servlet then sends a file ThanxProposal.htm to the user's terminal, shown by the Web browser as a text informing the user that the proposal has been accepted by the application. The servlet SProposalSubmit also enters the unique identifier of the user PersonID into the corresponding field in the table Proposal and enters the value 0 into the field State.

When the alternative "Judge proposal" is activated by the user one of two alternative procedures is started in order to choose a proposal to present to the user allowing the user to submit a judgment.

In the first alternative, the servlet SUnratedView has been configured to evaluate and compare proposals and select the proposal among proposals in state 1 and 2 not yet judged by the user with the highest value in the field JuNe in the table Proposal. Information from the table Unrated Proposals is used to identify the proposals not yet judged by the user. The proposal, information about the proposal and information about how the proposal may be judged (i.e. on a scale 1-5) is retrieved from the table and used to generate a file RateProposal.thtml.

In the second alternative, activation of the alternative "Judge proposal" activates the servlet SUnratedList, which generates a list containing all proposals in state 1 or 2 not yet judged by the user. Information about these proposals are stored in the tables UnratedProposals and Proposal. The proposals are evaluated, compared and ranked by the value in the field Current Results in the table Proposal. The information is used to generate a file VoteProposals.thtml which is passed to the user's terminal and showed as a picture by the Web browser. The picture contains a list with the proposals arranged after the value in the field Current Results in the table Proposals, with the proposal with the best chance of being among the N winning proposals (se below) on top of the list followed by the proposal with the second best chance of being among the winners and so forth, with the proposal with the least chance of being among the winners last. The user may choose the proposal he or she wishes to judge from the list. The list shows information about the proposals as entered when the proposals were submitted, i.e. a brief description or an indication of the chosen subject. For every proposal there is a field where the user may indicate that he or she wishes to judge the proposal. When this field is activated the servlet SUnratedView is started. In this alternative the servlet is configured to use the identifier of the chosen proposal ProposalID to retrieve information about the proposal and information about how the proposal may by judged, e.g. on a scale of 1-5). The servlet uses the information to generate a file RateProposal.thtml.

The file RateProposal.thtml is passed to the user's terminal and showed by the Web browser as a picture. The picture contains the proposal, information about the proposal and a field to enter a judgment concerning the proposal according to a predetermined method used in the entire application for all proposals, i.e. grades on a scale 1-5 or a judgment based on comparison with another proposal shown in the same picture. The generated pictures may look different in different applications, depending on which information is shown and the used method for judgment. When a user has entered information about how he or she judges the proposal, a servlet SRate is started. This servlet uses the identifier ProposalID and the chosen judgment to register the chosen judgment in the table Proposal. The judged proposal is removed from the table UnratedProposals. The same servlet also passes a file to the user's terminal, showed by the Web browser as a text indicating that the judgment has been accepted by the application.

When the alternative "Personal" is chosen a servlet SPersonView is started. The servlet uses the identifier PersonID (described below) to retrieve information from the table Personal, which is passed to the user's terminal and showed by the Web browser as a picture containing information about the user, i.e. name, email address, telephone number, sex, date of birth. There are also fields where information not available in the database may be entered by the user and fields where the user may update the information. The identifier PersonID is a unique identifier and may not be changed by the user. When the user after entering new information activates a field with the text "OK" the information is passed to the application and entered into the table Personal.

When an administrator activates the alternative "Adjust Parameters" the servlet SAdmin creates a file which is sent to the administrator's terminal and shown as a picture by the Web browser. This picture shows the different parameters of the application, the value for each parameter used by the application and a field to start and stop the Background Process. In this picture the administrator may enter or adjust values of the parameters N, the Number of winning proposals each time that results are produced, C, the length of each cycle, i.e. the time period between the times when results are produced, ET, the Evaluation Time, the amount of time any given proposal is being compared with other proposals, and JL, Judgment Life Span, the maximum time period during which an entered judgment is valid. When values are entered or adjusted the servlet SAdminSet enters the values into the table Settings in the database Pages. The servlet then activates the servlet SAdmin.

When the alternative "Create new users" is activated by the administrator a file NewUsers.htm is passed to the administrators terminal and showed as a picture by the Web browser. The picture contains a field allowing the administrator to enter the number of new users wished, called NumberOfUsers. When the number has been entered, the servlet SCreateUsers starts. The servlet creates a number of new identities PersonID equivalent to the number entered by the administrator, with corresponding passwords. For every new user identity a new row is added to the table Personal. The servlet then generates a file NewUsersList.thtml, which is passed to the administrator and shown by the Web browser as a picture. This picture shows the created user identities and corresponding passwords, allowing the administrator to distribute them to new users of the application.

EXAMPLE

The system will now be described in the context of the example briefly mentioned above; an Internet site containing a discussion forum where current political issues are discussed by the public. The public is invited to submit proposals for subjects to be discussed.

A visitor to the site chooses the Proposal Submission Procedure after completing the Login Procedure, and submits a proposal "Health insurance is expensive and important. How is it best arranged?" and the text "Health insurance" as information about the proposal. The text files are entered into the fields Proposal and Subject of the table Proposals respectively. The servlet SProposalSubmit generates a unique identifier and completes the field ProposalID, and enters the value 0 into the field State. A time stamp is registered in the field Transition Time.

If the method ProcessState( ) of the Background Process does not contain specified criteria for removal of Proposals to state 1 it will almost instantaneously change the value in the field State from 0 to 1. The proposal will initially be ignored by the methods ProcessState1, ProcessState2, CleanUpProposals and CleanUpGrades. The methods CalculateMean, CalculateJuNe and CalculateCurRes will enter values into the fields Mean, JuNe and Current Results respectively.

The proposal is presented to visitors to the site choosing the Judgment Procedure and their judgments are entered into the fields BF1, BF2, BF3, BF4 and BF5 respectively. The values registered in the fields JuNe, Current Results and Mean are continuously updated by the Background Process. The method CleanUpGrades will continuously delete judgments older than the specified JL.

When a time equivalent to or exceeding the time specified as a criterion in the method ProcessState1 has passed, or when all registered users of the application have judged the proposal, ProcessState1 will change the value in the field State from 1 to 2. The next time the method ProcessState2 is activated the proposal will be compared with other proposals. If the value in the field Mean for the discussed proposal is found to be among the N best values by the method, the value 3 is entered into the field State. The proposal is then available for further use and can be transmitted as a subject to the discussion on the described Internet site.

If the proposal is never transferred to state 3 it will finally be deleted by the method CleanUpProposals, when the time elapsed since the registered Transition Time exceeds ET as entered by the administrator.

The system can be used in many contexts, and the above is only an example. The system allows participative agenda setting and is thus valuable in a democratic process. If statements in a discussion are entered as proposals into the system, participants in the discussion will be able to moderate the discussion in cooperation. An organisation can use the system as a tool to encourage intellectual contributions (proposals and judgments) by employees or members, presenting the best contributions to the managers at regular intervals. The system allows a researcher to pose an open question to a group of respondents of unlimited size, and thus constitutes a new method for qualitative data collection and analysis, allowing simultaneous collection of quantitative data. The system can also be used to support interactive functions associated with broadcast media. The audience of a program can propose, select and present proposals and questions in real time.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. An online system for live interactive evaluation and comparison of a plurality of proposals in a first group and selection of proposals among the proposals in the first group to be included in a second group, the second group including only a predetermined number of proposals, the online system comprising a server including:
    a memory storing information about proposals, the memory having, for each proposal, a specific area storing information about the respective proposal; and
    a processor receiving judgments concerning proposals in the first group from users; the processor:
        performing for each user connected to the server a judgment submission procedure allowing the user to enter a judgment concerning a proposal, the judgment being a grade selected by the user from a scale of grades,
        performing a procedure of calculating an index indicating a measure of a need for any of the proposals included in the first group, but not included in the second group, in the case where the second group does not include the predetermined number of proposals, to receive more judgments, such judgments only being allowed from users who have not yet submitted any judgment concerning the proposal to make the proposal be included in the second group, and
    performing a further procedure of determining for any of the proposals included in the first group whether a mean of received judgments for the proposal meets a predetermined selection criteria so as to be included in the second group.

2. The online system of claim 1, wherein the processor calculates, in the procedure for calculating an index, the index as depending on judgments of said proposal.

3. The online system of claim 2, wherein the processor calculates, in the procedure for calculating an index, the index as also depending on judgments of proposals different from said proposal.

4. The online system of claim 2, wherein the processor calculates, in the procedure for calculating an index, the index as also depending on judgments of a reference proposal different from said proposal.

5. The online system of claim 1, wherein the processor calculates, in the procedure for calculating an index, the index as also depending on the number of judgments of said proposal in relation to the number of judgments of a reference proposal different from said proposal.

6. The online system of claim 1, wherein the processor receives proposals by performing, for each user connected to the server and after a request from the user, a proposal submission procedure allowing the user to submit at least one proposal and by reserving, after having received a proposal, a specific area for the proposal in the memory and storing the proposal in said area in the memory.

7. The online system of claim 1, further comprising user devices for users, the user devices being connected to the server and each of the user devices comprising:
    a display unit allowing a user to be informed of information stored in the specific memory areas for the proposals; and
    an input unit for entering, in the judgment submission procedure performed by the server, information on judgments of proposals, this information stored in fields in the specific memory areas for the proposals.

8. The online system of claim 7, wherein the processor, in performing the judgment submission procedure for a user connected to the server, sends information to the display unit of the user, making the display unit show information of the proposal that has a value of the index indicating the highest measure of a need to receive more judgments and allowing the user to enter a judgment concerning said proposal.

9. An online system for live interactive evaluation and comparison of proposals in a first group and selection of proposals among the proposals in the first group to be included in a second group, the second group including only a predetermined number of proposals, the online system comprising a server including:
    a memory storing information about proposals, the memory having, for each proposal, a specific area storing information about the respective proposal;
    user devices for users, the user devices being connected to the server and each of the user devices comprising:

a display unit allowing a user to be informed of information stored in the specific memory areas for the proposals; and an input unit for entering information on proposals; and a processor receiving information on judgments of proposals from the user devices, each of the judgments being a grade selected by the user from a scale of grades; the processor performing for each user connected to the server a judgment submission procedure, the judgment submission procedure including:

a procedure for sending information to the display unit of the user making the display unit show information of a proposal;

a procedure allowing the user to enter, using the input unit of the user's input device, information on the user's judgment of the proposal for which information is shown; and a procedure for storing the information entered by the user in fields in the specific memory area for the proposal in the memory; and the processor:

performing a procedure of continuously calculating an index for identifying, in the case where the second group does not include the predetermined number of proposals, that one of the proposals included in the first group but not included in the second group that needs the next judgment from a user who has not yet submitted any judgment concerning the proposal to make the proposal be included in the second group, the procedure for sending information to the display unit using information of this proposal in the sending of information to be shown on the user's display unit, and performing a further procedure of determining for any of the proposals included in the first group, whether a mean of received judgments for the proposal meets a predetermined selection criteria so as to be included in the second group.

10. The online system of claim 9, wherein the processor, in the procedure for continuously identifying a proposal, uses, in the identifying of the proposal, information already received from users on judgments of said proposal.

11. The online system of claim 10, wherein the processor, in the procedure for continuously identifying a proposal, uses, in the identifying of the proposal, information already received from users on judgments of proposals different from said proposal.

12. The online system of claim 10, wherein the processor, in the procedure for continuously identifying a proposal, uses, in the identifying of the proposal, information already received from users on judgments of a reference proposal different from said proposal.

13. The online system of claim 9, wherein the processor, in the procedure for continuously identifying a proposal, uses, in the identifying of the proposal, information on the number of judgments of said proposal in relation to the number of judgments of a reference proposal different from said proposal.

14. The online system of claim 9, wherein the processor further receives proposals by performing, for each user connected to the server and after a request from the user, a proposal submission procedure allowing the user to submit at least one proposal and by reserving, after having received a proposal, a specific area for the proposal in the memory and storing the proposal in said area in the memory.

* * * * *